United States Patent
Das et al.

(10) Patent No.: US 11,353,574 B2
(45) Date of Patent: Jun. 7, 2022

(54) SYSTEM AND METHOD FOR TRACKING MOTION OF TARGET IN INDOOR ENVIRONMENT

(71) Applicant: Tata Consultancy Services Limited, Mumbai (IN)

(72) Inventors: Rajat Kumar Das, Kolkata (IN); Arijit Chowdhury, Kolkata (IN); Tapas Chakravarty, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 382 days.

(21) Appl. No.: 16/775,592

(22) Filed: Jan. 29, 2020

(65) Prior Publication Data
US 2020/0284895 A1    Sep. 10, 2020

(30) Foreign Application Priority Data
Feb. 8, 2019    (IN) .............................. 201921005118

(51) Int. Cl.
*G01S 13/32* (2006.01)
*G01S 13/58* (2006.01)
(Continued)

(52) U.S. Cl.
CPC ................ *G01S 13/66* (2013.01); *G01S 7/35* (2013.01); *G01S 13/32* (2013.01); *G01S 13/505* (2013.01);
(Continued)

(58) Field of Classification Search
CPC ............ G01S 13/66; G01S 7/35; G01S 13/32; G01S 13/505; G01S 13/589;
(Continued)

(56) References Cited

U.S. PATENT DOCUMENTS

| 6,064,942 A | * | 5/2000 | Johnson | ............... | G01C 21/005 |
| | | | | | 434/1 |
| 7,783,510 B1 | * | 8/2010 | Gilgur | .............. | G06Q 10/06315 |
| | | | | | 705/7.31 |

(Continued)

FOREIGN PATENT DOCUMENTS

| CN | 107121667 | 9/2017 |
| ES | 2685511 | 6/2018 |

(Continued)

*Primary Examiner* — Donald H B Braswell
(74) *Attorney, Agent, or Firm* — Finnegan, Henderson, Farabow, Garrett & Dunner LLP (57) ABSTRACT

This disclosure relates generally to tracking motion of target in indoor environment. The method includes estimating an initial position of the target in a mesh grid form based on radar data captured from radar devices installed in the indoor environment. For a subsequent target movement, a subsequent position of the target is estimated in the mesh grid form based on the initial position and a resultant velocity vector of the target. A number of outlier grid-points is computed with a threshold number, and based on comparison the outlier grid-points are either replaced with interpolated grid-points or the subsequent position of the target is repaired based on a probable position of the target obtained from at least one of a linear regression based analysis of prior positions of the target, prior knowledge of the target velocity and sampling interval, and a trilateration based technique.

15 Claims, 8 Drawing Sheets

(51) Int. Cl.
*G01S 13/89* (2006.01)
*G01S 13/72* (2006.01)
*G01S 13/87* (2006.01)
*G01S 13/50* (2006.01)
*G01S 13/66* (2006.01)
*G01S 7/35* (2006.01)

(52) U.S. Cl.
CPC .......... *G01S 13/589* (2013.01); *G01S 13/723* (2013.01); *G01S 13/878* (2013.01); *G01S 13/89* (2013.01)

(58) Field of Classification Search
CPC ...... G01S 13/723; G01S 13/878; G01S 13/89; G01S 7/415; G01S 13/886; G01S 13/88
See application file for complete search history.

(56) References Cited

U.S. PATENT DOCUMENTS

| | | | |
|---|---|---|---|
| 9,074,848 B1* | 7/2015 | Hunter, Jr. | F41G 7/2246 |
| 2018/0143315 A1* | 5/2018 | Shirai | G01S 13/931 |
| 2020/0033444 A1* | 1/2020 | Marsch | G01S 13/931 |
| 2021/0190702 A1* | 6/2021 | Wu | G01S 7/411 |

FOREIGN PATENT DOCUMENTS

| | | |
|---|---|---|
| KR | 2015-0105119 | 9/2015 |
| KR | 10-1751170 | 6/2017 |
| WO | WO-2018/037425 | 3/2018 |

\* cited by examiner

SYSTEM AND METHOD FOR TRACKING MOTION OF TARGET IN INDOOR ENVIRONMENT

PRIORITY CLAIM

This U.S. patent application claims priority under 35 U.S.C. § 119 to: India Application No. 201921005118, filed on Feb. 8, 2019. The entire contents of the aforementioned application are incorporated herein by reference.

TECHNICAL FIELD

This disclosure relates generally to motion tracking, and more particularly to system and method for tracking motion of target in indoor environment.

BACKGROUND

Motion tracking refers to capabilities of surveillance system to detect motion of objects. Typically, the surveillance systems embody sensors that can detect motion or speed of moving objects through Doppler principle. According to the Doppler principle, the frequency of a transmitted electromagnetic signal shifts because of any target movement within the transmitter vicinity.

The inventors here have recognized several technical problems with such conventional systems, as explained below. In the aforementioned context, continuous wave (CW) radar can be used to detect the target radial velocity. However, the CW radar fails to estimate the range of the target, and hence cannot be used for target localization purpose. Various other conventional surveillance systems utilize target localization using camera-based systems, mobile phone-based systems and/or Bluetooth-based systems. Certain other systems may use multiple continuous wave frequency modulated (FMCW) based radar module for estimating both target velocity and target range.

The target localization such as camera based, and mobile phone based Bluetooth systems may not be acceptable in privacy sensitive scenarios and in different ambient lighting conditions. The FMCW based radar modules are mainly used for outdoor localization purpose like missile or aircraft tracking, where meter or centimeter level accuracy is not required. However, in case of indoor position system where a meter level accuracy is preferred, the FMCW based radar modules may not be effective. Moreover, the conventional surveillance systems using multiple CW radars operate in a computationally heavy manner and are prone to localization error.

SUMMARY

Embodiments of the present disclosure present technological improvements as solutions to one or more of the above-mentioned technical problems recognized by the inventors in conventional systems. For example, in one embodiment, a method for tracking motion of target in indoor environment is provided. The method includes estimating, via one or more hardware processors, an initial position of the target based at least on radar data captured from a plurality of radar devices installed in the indoor environment. The initial position of the target is estimated in form of a mesh grid having a plurality of grid-points. Further the method includes estimating, for a subsequent target movement, a subsequent position of the target based on the initial position of the target and a resultant velocity vector of the target, via the one or more hardware processors. The resultant velocity vector is obtained from the initial position and a plurality of velocity vectors of the target corresponding to the plurality of radar devices. The subsequent target position is estimated in form of a mesh grid. Furthermore the method includes determining, via the one or more hardware processors, whether a number of outlier grid-points in the mesh grid associated with the subsequent position of the target is more than a threshold number of grid-points. Based on the determination of the number of outlier grid-points, the method includes replacing the outlier grid-points with interpolated grid-points obtained based on linear interpolation to obtain the subsequent position of the target in mesh grid form, if the number of outlier grid-points in the mesh grid is less than or equal to the threshold number of grid-points. Also, if the number of outlier grid-points in the mesh grid is more than the threshold number of grid-points, the method includes repairing the subsequent position of the target based on a determination of a probable position of the target obtained from at least one of a linear regression based analysis of prior positions of the target, a prior knowledge of the target velocity and sampling interval, and a trilateration based technique.

In another aspect, a system for tracking motion of a target in indoor environment is provided. The system include a memory storing instructions, one or more communication interfaces; and one or more hardware processors coupled to the memory via the one or more communication interfaces, wherein the one or more hardware processors are configured by the instructions to estimate an initial position of the target based at least on radar data captured from a plurality of radar devices installed in the indoor environment. The initial position of the target is estimated in a form of mesh grid having a plurality of grid-points. Further, the one or more hardware processors are configured by the instructions to estimate, for a subsequent target movement, a subsequent position of the target based on the initial position of the target and a resultant velocity vector of the target. The resultant velocity vector is obtained from the initial position and a plurality of velocity vectors of the target corresponding to the plurality of radar devices, the subsequent target position estimated in form of a mesh grid. Furthermore, the one or more hardware processors are configured by the instructions to determine whether a number of outlier grid-points in the mesh grid is more than a threshold number of grid-points. Moreover, the one or more hardware processors are configured by the instructions to replace the outlier grid-points with interpolated grid-points obtained based on linear interpolation to obtain the subsequent position of the target in mesh grid form, if the number of outlier grid-points in the mesh grid is less than or equal to the threshold number of grid-points. Also, the one or ore hardware processors are configured by the instructions to repair the subsequent position of the target based on a determination of a probable position of the target obtained from at least one of a linear regression based analysis of prior positions of the target, a prior knowledge of the target velocity and sampling interval, and a trilate ation based technique, if the number of outlier grid-points in the mesh grid is determined to be more than the threshold number of grid-points.

In yet another aspect, a non-transitory computer-readable medium having embodied thereon a computer program for executing a method for tracking motion of target in indoor environment is provided. The method includes estimating, via one or more hardware processors, an initial position of the target based at least on radar data captured from a plurality of radar devices installed in the indoor environment. The initial position of the target is estimated in a mesh grid form having a plurality of grid-points. Further the method includes estimating, for a subsequent target movement, a subsequent position of the target based on the initial position of the target and a resultant velocity vector of the target, via the one or more hardware processors. The resultant velocity vector is obtained from the initial position and a plurality of velocity vectors of the target corresponding to the plurality of radar devices. The subsequent target position is estimated in form of a mesh grid. Furthermore the method includes determining, via the one or more hardware processors, whether a number of outlier grid-points in the mesh grid is more than a threshold number of grid-points. Based on the determination of the number of outlier grid-points, the method includes replacing the outlier grid-points with interpolated grid-points obtained based on linear interpolation to obtain the subsequent position of the target in form of a mesh grid, if the number of outlier grid-points in the mesh grid is less than or equal to the threshold number of grid-points. Also, if the number of outlier grid-points in the mesh grid is more than the threshold number of grid-points, the method includes repairing the subsequent position of the target based on a determination of a probable position of the target obtained from at least one of a linear regression based analysis of prior positions of the target, a prior knowledge of the target velocity and sampling interval, and a trilateration based technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Video surveillance systems are being widely utilized for tracking motion of objects at a variety of places, including but not limited to, parking lots, campus, shopping complexes, hospitals, and so on and so forth. Said systems embody radar devices that operate on Doppler principle. According to the Doppler principle, the frequency of electromagnetic signal transmitted from the Doppler radars shift because of any target movement within the transmitter vicinity. In this context, continuous wave (CW) radar can be used to detect the target radial velocity. However, the CW radar device fails to estimate the range of the target. Due to this shortcoming, single CW radar may not be used for target localization purpose. Herein, the term 'target' refers to an object whose motion is being tracked by the surveillance system. In context of disclosed embodiments, the term 'target' refers to human being(s).

In state of art, for the purpose of target localization, systems such as camera based system, mobile phone based system, and Bluetooth based system are utilized, however such systems may not be acceptable in privacy sensitive scenarios and in different ambient lighting conditions. Alternatively, conventional systems utilize multiple continuous wave frequency modulated (FMCW) based radar module where both the target velocity and target range can be estimated. In contrast to the CW radar, the FMCW radar can change its operating frequency during the measurement i.e. the transmission signal is modulated in frequency. However, FMCW radars are primarily used for outdoor localization purpose, for instance missile tracking, aircraft tracking, and so on, where meter or centimeter level accuracy is not required.

Various embodiments disclosed herein provide method and system for motion tracking of target in indoor environment in a precise and accurate manner, particularly such that a meter or centimeter level accuracy is obtained. For example, in various embodiments, the disclosed system utilizes multiple CW radar devices that are installed in the indoor environment for motion tracking. Prior to initiating the tracking of motion, said CW radar device may be in a sleep mode till at least one of the CW radar device detects target movement/motion. Then, to estimate the initial target position, by using a higher sampling rate consecutive radar devices Doppler data is captured, and subsequently the position of the target is determined using the Doppler data. Herein, computation of the position of the target may be a computationally intensive, therefore after detecting the initial target position, the disclosed embodiments further enables target localization. In an embodiment, every radar device installed in the indoor environment obtains a target speed in line of sight thereof, and based on a current target position a velocity vector is computed to obtain a subsequent target position. Further, the embodiments facilitate minimization of the accumulated localization error by utilizing a trilateration based heuristic method at a regular interval. A detailed description of the above described system and method for motion tracking of target in the indoor environment is shown with respect to illustrations represented with reference to FIGS. 1 through 7B.

Referring now to the drawings, and more particularly to FIG. 1 through 7B, where similar reference characters denote corresponding features consistently throughout the figures, there are shown preferred embodiments and these embodiments are described in the context of the following exemplary system and/or method.

Figure 1:
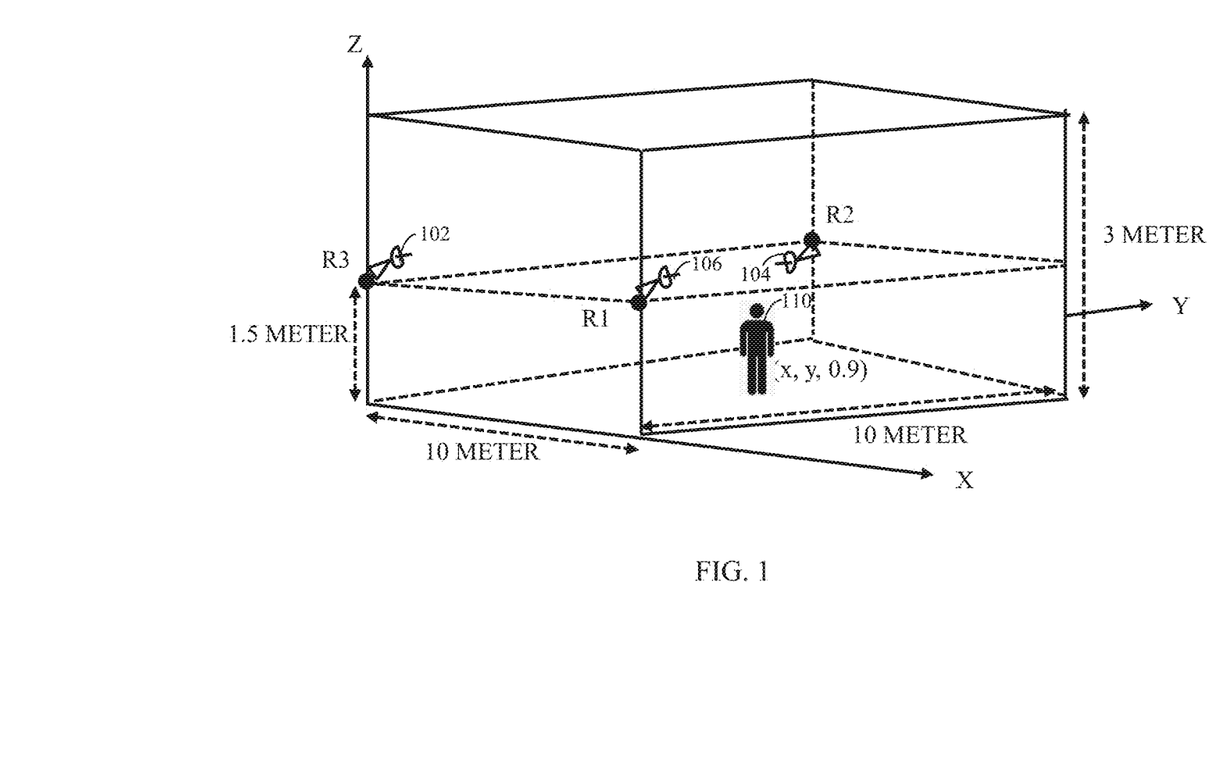
FIG. 1 illustrates an indoor environment for motion tracking of a target therein, according to some embodiments of the present disclosure.

FIG. 1 illustrates an indoor environment 100 for motion tracking of a target therein, in accordance with an example embodiment. The indoor environment 100 may be equipped with multiple CW radar devices, for example, radar devices 102, 104, 106, and 108. In an embodiment, the indoor environment may be equipped with four or more radar devices. Herein, it will be understood that movement of a a target, for instance a person can have three degree of freedom (DOF), and if the target moves exactly in the line connecting two radars, then the solution become ambiguous. To overcome this scenario four radars may be utilized. In an embodiment, the radar devices may be in-phase and quadrature (I/Q) based Doppler radar. Each of the radar devices may include a processor/controller for acquisition of radar data and identifying Doppler frequencies therefrom. Each unit is mounted on a holder, for example on walls of the indoor environment, and kept at a certain height. In an example scenario, where the target may be a human, for example, a human 110, the radar devices may be installed at a height of 1.5 meters from the base/floor of the room. The radar devices may be aimed towards the center of the indoor environment, for instance the room. Moreover, each of the radar devices may be arranged so that forward direction and vertical direction of said radar are perpendicular to each other, as illustrated in FIG. 1.

The plurality of radar devices 102, 104, 106, and 108, may be communicably coupled to a computing device (not shown in FIG. 1) which may be capable of processing the radar data received from each radar device for localization and tracking of the target precisely in the indoor environment. A network environment implementing a system having the computing device for tracking motion of the target in the indoor environment is described further in detail with reference to FIG. 2.

Figure 2:
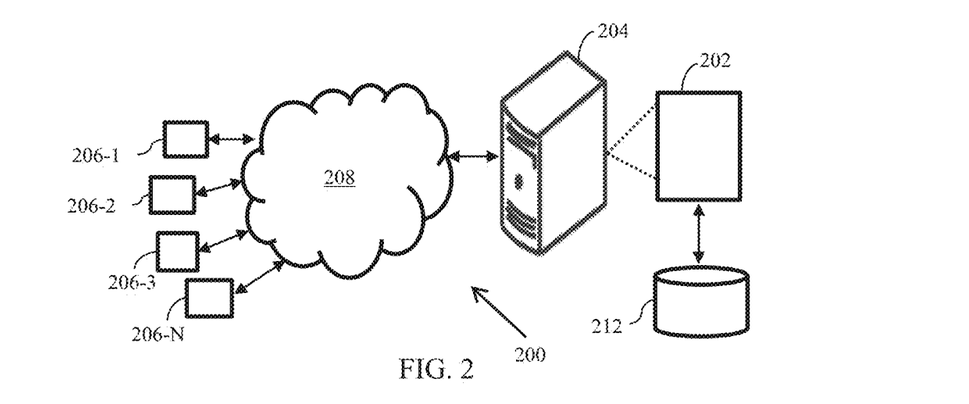
FIG. 2 illustrates a network environment implementing a system for tracking motion of target in an indoor environment, according to some embodiments of the present disclosure.

FIG. 2 illustrates a network environment 200 implementing a system 202 for tracking motion of target in an indoor environment, according to an embodiment of the present subject matter. Herein the indoor environment may be the indoor environment 100 explained with reference to FIG. 1.

In an embodiment, the system 202 acquires radar data from a plurality of radar devices installed in the indoor environment. The system 202 calculates a resultant velocity vector of the target with respect to the multiple radar devices using the radar data. The system estimates subsequent target position based on resultant velocity vector and a current position of the target. An important contribution of the disclosed embodiments is representation of the subsequent position of the target in a mesh grid form, where the mesh grid includes a plurality of grid-points and each grid-point is a probable next position of the target. The advantage of computing the next position of the target in form of the grid instead of a point is that, it is hard to exactly pin point the target position, but with the grid form computation of the target position, by iterations the noisy mesh grid-points may be eliminated.

The system 202 determines a number of outlier grid-points in the mesh grid, and compares said number with a threshold number of grid-points. In case it is determined that the number of outlier grid-points is more that the threshold number of grid-points, the system 202 takes multiple approaches to overcome error in computation of the grid-points. The aforementioned approaches to overcome the error are described further with reference to FIGS. 3 through 7B. Herein, said comparison of number of grid-points with the threshold number of grid-points enables predicting whether the error in computation of the grid-points is within limits or has grown out of bound.

Although the present disclosure is explained considering that the system 202 is implemented on a server, it may be understood that the system 202 may also be implemented in a variety of computing systems, such as a laptop computer, a desktop computer, a notebook, a workstation, a cloud-based computing environment and the like. It will be understood that the system 202 may acquire radar data from multiple radar devices 206-1, 206-2 . . . 206-N, collectively referred to as radar devices 206 hereinafter, or applications residing on the devices 206. In an embodiment, the radar devices may be CW radar devices.

Further, the system 202 may be communicatively coupled with a variety of user devices, for example devices 208-1, 208-2, 208-N, collectively referred to as devices 208 hereinafter, or applications residing on the devices 208. Examples of the devices 208 may include, but are not limited to, a portable computer, a personal digital assistant, a handheld device, a smartphone, a tablet Computer, a workstation and the like. The devices 208 are communicatively coupled to the system 202 through a network 210.

In an embodiment, the network 210 may be a wireless or a wired network, or a combination thereof. In an example, the network 210 can be implemented as a computer network, as one of the different types of networks, such as virtual private network (VPN), intranet, local area network (LAN), wide area network (WAN), the internet, and such. The network 210 may either be a dedicated network or a shared network, which represents an association of the different types of networks that use a variety of protocols, for example, Hypertext Transfer Protocol (HTTP). Transmission Control Protocol/Internet Protocol (TCP/IP), and Wireless Application Protocol (WAP), to communicate with each other. Further, the network 210 may include a variety of network devices, including routers, bridges, servers, computing devices, storage devices. The network devices within the network 210 may interact with the system 202 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212.

In an embodiment, the system 202, the network environment 200 supports various connectivity options such as BLUETOOTH®, USB, ZigBee and other cellular services. In an exemplary embodiment, the system 202 interfaces with radar devices 206 using the aforementioned connectivity options. Based on the radar data collected from various radar devices, the system 202 with the help of various hardware and software platforms, collectively performs the task of tracking motion of the target in the indoor environment. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. The components and functionalities of the system 202 are described further in detail with reference to FIG. 3.

Figure 3:
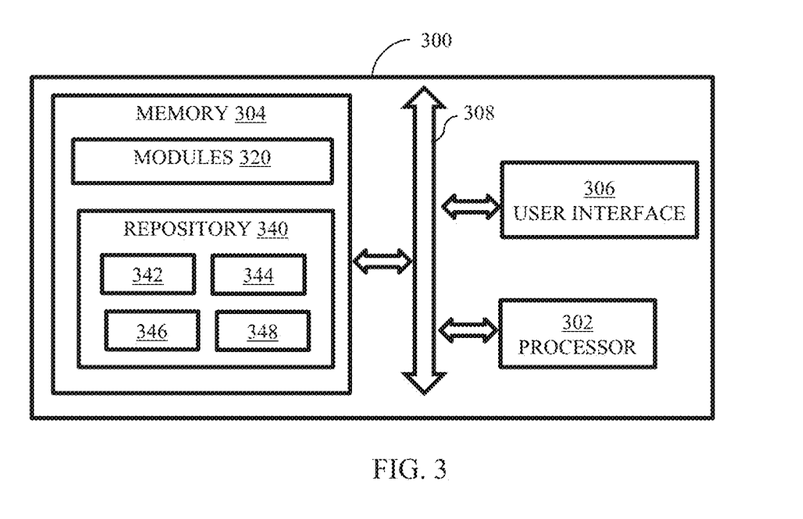
FIG. 3 illustrates a block diagram of a system for tracking motion of target in indoor environment, according to some embodiments of the present disclosure.

FIG. 3 illustrates a block diagram of a system 300 for tracking motion of target in indoor environment, in accordance with an example embodiment. The system 300 may be an example of the system 202 (FIG. 2). In an example embodiment, the system 300 may be embodied in, or is in direct communication with the system, for example the system 202 (FIG. 2).

The system 300 includes or is otherwise in communication with one or more hardware processors such as a processor 302, at least one memory such as a memory 304, and an I/O interface 306. The processor 302, memory 304, and the I/O interface 306 may be coupled by a system bus such as a system bus 308 or a similar mechanism. The I/O interface 306 may include a variety of software and hardware interfaces, for example, a web interface, a graphical user interface, and the like. The interfaces 306 may include a variety of software and hardware interfaces, for example, interfaces for peripheral device(s), such as a keyboard, a mouse, an external memory, and a printer. Further, the interfaces 306 may enable the system 300 to communicate with other devices, such as web servers and external databases. The interfaces 306 can facilitate multiple communications within a wide variety of networks and protocol types, including wired networks, for example, local area network (LAN), cable, and so on, and wireless networks, such as Wireless LAN (WLAN), cellular, or satellite. For the purpose, the interfaces 306 may include one or more ports for connecting a number of computing systems with one another or to another server computer. The I/O interface 306 may include one or more ports for connecting a number of devices to one another or to another server.

The hardware processor 302 may be implemented as one or more microprocessors, microcomputers, microcontrollers, digital signal processors, central processing units, state machines, logic circuitries, and/or any devices that manipulate signals based on operational instructions. Among other capabilities, the hardware processor 302 is configured to fetch and execute computer-readable instructions stored in the memory 304.

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 304 includes a plurality of modules 320 and a repository 340 for storing data processed, received, and generated by one or more of the modules 320. The modules 320 may include routines, programs, objects, components, data structures, and so on, which perform particular tasks or implement particular abstract data types. The repository 340, amongst other things, includes a system database 342 and other data 344. The other data 344 may include data generated as a result of the execution of one or more modules in the modules 320.

In order to track motion of the target in the indoor environment, the system 300 estimates an initial position of the target. The initial position of the target may be estimated based at least on radar data captured from a plurality of radar devices installed in the indoor environment. Herein, it will be understood that each of the plurality of radar devices collects radar data at a high sampling rate (compare to the object speed) to get multiple successive Doppler frequency values. For instance, in the present embodiment, the system 300 obtains three successive Doppler frequency values f(0), f(τ), f(2τ) where τ is the time interval between the samples of Doppler frequency values, as shown in Equation (1). In an embodiment, each of the radar devices may include a corresponding processor to collect the radar data at the high sampling rate. Using said Doppler frequency values, Doppler derivatives (f,ḟ,f̈) are calculated as shown in Equation (1) below.

$$\begin{bmatrix} f \\ \dot{f}\tau \\ \ddot{f}\tau^2/2 \end{bmatrix} = \begin{bmatrix} 1 & 0 & 0 \\ -3/2 & 2 & -1/2 \\ 1/2 & -1 & 1/2 \end{bmatrix} \begin{bmatrix} f(0) \\ f(\tau) \\ f(2\tau) \end{bmatrix} \quad (1)$$

The system 300 utilizes the Doppler derivatives to calculate a target range with respect to each radar device, as shown in Equation (2), as shown below.

$$R_0 \cong (3/2)\lambda(\ddot{f}\dot{f}/\ddot{f}) \quad (2)$$

The system 300 estimates the position of the target by using target range as input to the trilateration method/technique. The trilateration technique is defined as the process of determining absolute or relative positions of points by measurement of distances, using the geometry of circles, spheres or triangles. Depending upon the scenario, heuristic constraints may be applied to verify the estimated target position. In an example scenario, the target is a human in motion in the indoor environment. Hence, in this particular case, the heuristic constraints may include z-coordinate to lie within 0<z<1.8 meter based on the human height into consideration. If the calculated position xyz (or initial position of the target) doesn't lies in the predefined z-region, the system may take subsequent three Doppler frequency values to find out the initial target coordinates.

As will be understood, in the indoor environment, the system 300 may experience noise. Hence, the system 300 models environmental noise the initial target position (xyz) is represented into a mesh grid form having a plurality of grid-points. In an example embodiment, the mesh grid may have around 20 points. The centre of the mesh grid may represent the estimated position (or the initial position of the target). Also, the area of the mesh grid depends on the target speed and noise variance. Here, every mesh-grid could be a possible position of the target.

For a subsequent target movement, the system 300 estimates subsequent position of the target. The system 300 estimates subsequent position of the target based on the initial position of the target and a resultant velocity vector of the target, as will be explained below.

The system 300 obtains a speed/velocity ($V_{r_i}$) of the target in a light of sight of the plurality of radar devices, as shown in Equation (3), where $R_i$ is the position of the $i^{th}$ radar device, xyz is the current target position and $\overline{V}$ is the target velocity vector. The Doppler frequency value is calculated from velocity of the target the radar detected by the radar device, as shown in Equation (4):

$$V_{r_i} = dot(R_i - xyz, \overline{V})/norm(R_i - xyz) \quad (3)$$

-continued $$f_{d_i} = \frac{2V_{r_i}}{\lambda} \quad (4)$$

The system 300 combines values of velocity of the target obtained from each of the plurality of radars to obtain a resultant velocity vector $\overline{V}_{EST}$ using equations:

$$D_i = (xyz_p - R_i) \quad (5)$$

$$\overline{V}_{Est} \Leftarrow g(V_{r_1}, V_{r_2}, \ldots, V_{r_N}, D_1, D_2 \ldots D_i) \text{ where, } i \geq 3, \quad (6)$$

where, ($D_i$) is the radar direction vector forradar device of the plurality of radar devices, ($V_{r_i}$) is received velocity by each of the plurality of radar devices, The system predicts the subsequent position of the target by using the equation, $$xyz_p \Leftarrow xyz_p + \overline{V}_{Est} \cdot dt \quad (7)$$

where dt is the sampling interval.

As already described, instead of a single point (xyz), the position of the target is represented as grid mesh $xyz_{p_1}$, $xyz_{p_2}$, ... $xyz_{p_n}$. Hence, the subsequent position of the target is also represented in the form of a mesh-grid. The mesh-grid form of the position of the target is represented further with reference to FIG. 4A.

It will be understood that due to environmental noise, there may be error in computation of the position of the target. In order to mitigate the effect of said error, the system 300 is configured to determine the number of outlier grid-points in the mesh grid at every position computed by the system 300. In an embodiment, the system 300 checks the radius of the mesh-grid. For example, the system 300 may determine radius of the mesh-grid in terms of Euclidean distance to determine whether the number of grid-points within the Euclidean distance that lie within a single cluster. The aforementioned determination may be referred to as cluster consistency check. The system 300 performs a cluster consistency check at every probable position of the target. Additionally or alternatively, the system 300 may determine whether a number of outlier grid-points in the mesh grid are more than a threshold number of grid-points. In an example embodiment, the threshold number of grid-points is around twenty percent of a total number of grid-points in the mesh-grid. An example process flow representation for computation of position of the target is illustrated and described with reference to FIG. 4A.

Figure 4A:
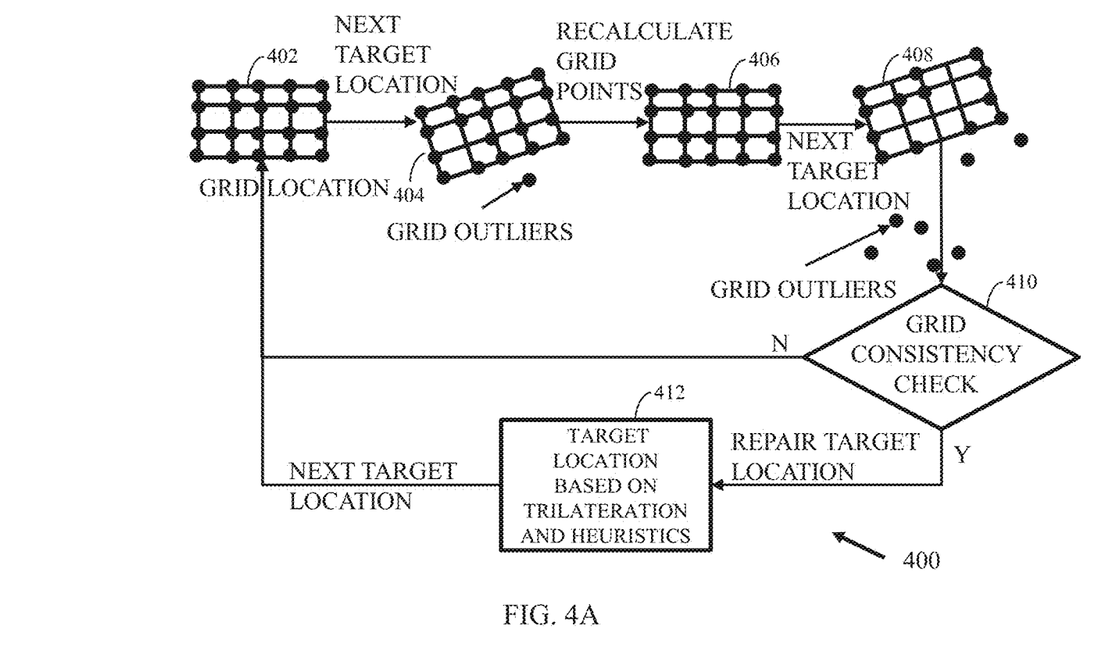
FIG. 4A illustrates an example process flow for estimation of position of the target is illustrated, according to some embodiments of the present disclosure.

Referring to FIG. 4A, an example process flow 400 for estimation of position of the target is illustrated, in accordance with an example embodiment. As described previously and illustrated herein, a mesh grid, for example a mesh grid 402 is computed based on the radar data captured from a plurality of radar devices installed in the indoor environment. The mesh-grid 402 may include a plurality of grid-points. For a subsequent target movement, a subsequent position of the target is estimated in form of a mesh grid, for example, the mesh-grid 404, as described above. The system 300 may determine a number of outlier grid-points in the mesh-grid 404. As is seen from FIG. 4A, the mesh-grid 404 contains a single outlier.

If the system 300 determines that the number of outlier grid-points in the mesh grid is less than or equal to the threshold number of grid-points, the system 300 replace the outlier grid-points with interpolated grid-points obtained based on linear interpolation to obtain the subsequent position of the target in mesh grid form. For example, in the present scenario since there is a single outlier grid-point, the system 300 may replace said outlier grid-point with interpolated grid-points and generate a mesh-grid 406.

Also, for a subsequent movement of the target, the system 300 may again estimate the subsequent position of the target based at least one the radar data and the position of the target as provided by the mesh-grid 406. Herein, the subsequent position of the target is represented by the mesh-grid 408. As is seen, the mesh-grid 408 includes a plurality of outlier grid-points. At this stage, the system 300 may perform a grid consistency check to compare the number of outlier grid-points in the mesh grid with a threshold number of grid-points, at 410. If at 410, the system 300 determines that the number of outlier grid-points in the mesh grid is more than the threshold number of grid-points, the system 300 repairs the subsequent position of the target. The system 300 repairs the computed subsequent position based on a determination of a probable position of the target obtained from at least one of a linear regression based analysis of prior positions of the target, a prior knowledge of the target velocity and sampling interval, and a trilateration based technique, at 412. The repairing of the computed subsequent position of the target is described further in detail with reference to FIG. 4B.

To update the current position of the target, the system 300 utilizes an intersection of three approaches, namely, a linear regression based analysis of prior positions of the target, a prior knowledge of the target velocity and sampling interval, and a trilateration based technique. For example, the system 300 may run a linear regression based analysis on a plurality of prior positions of the target to obtain a subsequent next position of the target. Secondly, based target velocity and sampling interval, the system 300 may draw a sphere of specific radius around the present target position to obtain the target next position. Thirdly, the system 300 may predict the subsequent position of the target based on the trilateration based approach, as described below with reference to FIG. 4B. Herein, it will be understood that due to noise in trilateration method, the system assumes a donut like structure instead of a circle.

Figure 4B:
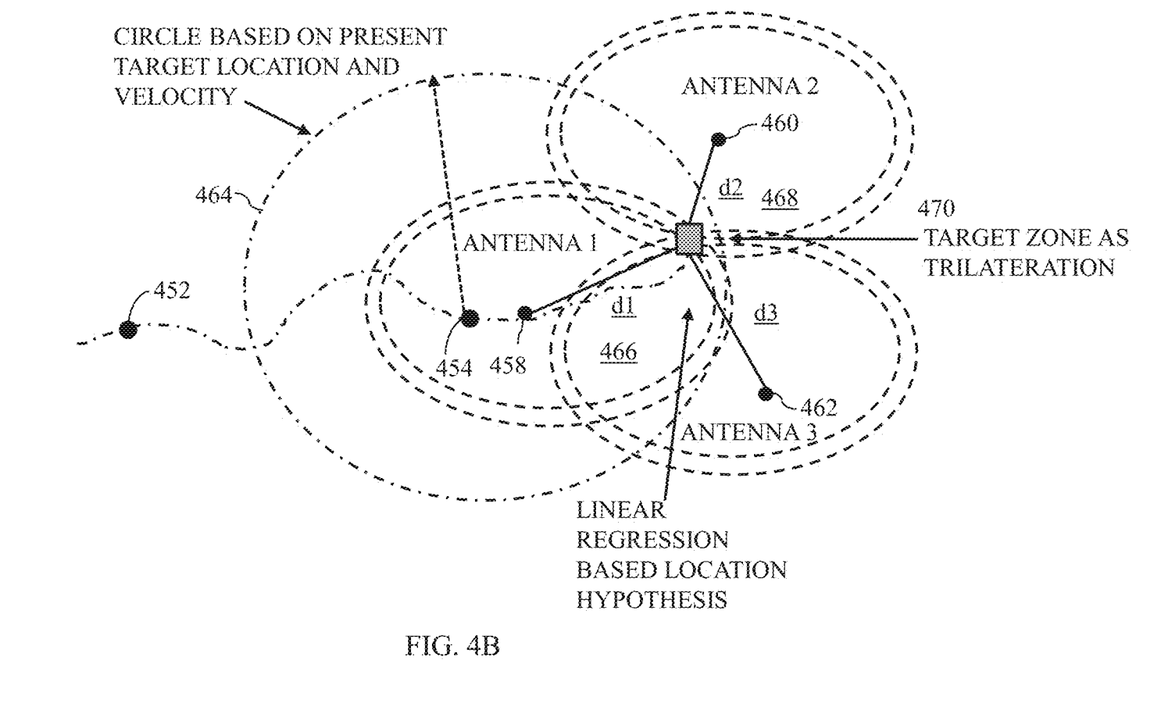
FIG. 4B illustrates subsequent position localization of a target by repairing the subsequent position of the target, according to some embodiments of the present disclosure.

As illustrated in FIG. 4B, subsequent position localization of a target by repairing the subsequent position of the target is represented in accordance with an example embodiment. As illustrated herein, a target moved from an initial position 452 to a subsequent position 454 via a path 456 in the indoor environment. The indoor environment is equipped with three radar devices, namely, radar devices 458, 460, 462. Herein, it will be understood that for the brevity of description here only three radar devices and hence three donut circles have been considered, however, the number of such donut circles may vary depending on the number of radar devices in the indoor environment. In an embodiment, the system 300 may draw a circular zone based on a current position of the target and the estimated velocity of the target to obtain a first area (represented by the circular zone) 464. The system 300 then predicts the current position based on regression of previous positions of the target and represents the current position by a second area 466. The system performs trilateration based on the radar data obtained from the radar devices (for example three radar devices shown in the FIG. 4B) and using Levanon technique to obtain a third area 468.

The system 300 determines if all the three methods have an intersection area, a centroid of that area is taken as the subsequent position of the target. For example, as illustrated in FIG. 4B, the centroid 470 of the intersection area # of the three methods is taken as subsequent target position. The system obtains an intersection between the first area 464, the second area 466 and the third area 468, and determines a centroid of the first area 464, the second area 466 and the third area 468. Said centroid may be taken as the subsequent position of the target. Alternatively, if any two methods intersect, then centroid of a common area between the two methods is taken as the subsequent position of the target. If, however, there is no intersection between these three methods then the trilateration based centroid position is taken as subsequent position of the target.

Figure 5:
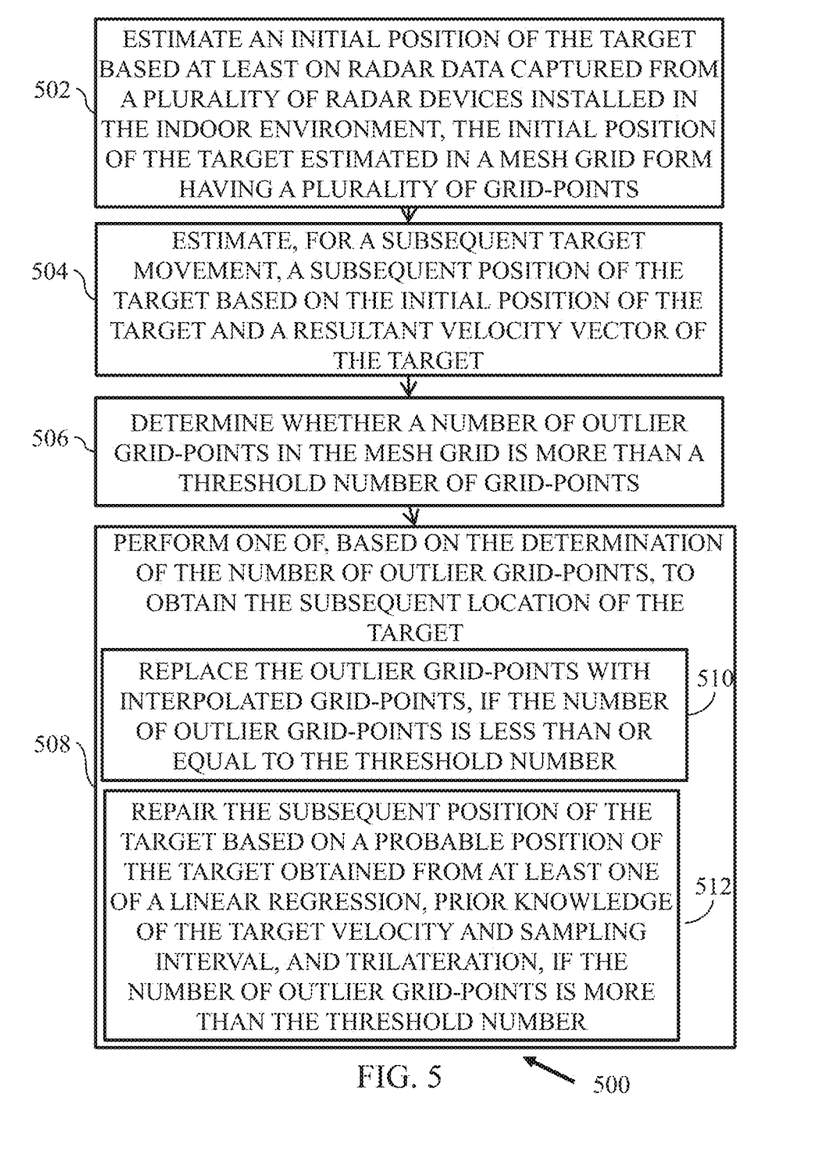
FIG. 5 illustrates a flow diagram of a method for tracking motion of target in indoor environment, according to some embodiments of the present disclosure.

Referring to FIG. 5, a flow diagram of a method 500 for tracking motion of target in indoor environment, in accordance with an example embodiment. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, the system 202 of FIG. 2. In an example embodiment, the system 202 may be embodied in an exemplary computer system.

At 502, the method 500 includes estimating an initial position of the target based at least on radar data captured from a plurality of radar devices installed in the indoor environment. The initial position of the target is estimated in a mesh grid form having a plurality of grid-points. The mesh grid having the plurality of grid-points is illustrated and described with reference to FIG. 4A.

At 504, the method 500 includes estimating, for a subsequent target movement, a subsequent position of the target based on the initial position of the target and a resultant velocity vector of the target. The resultant velocity vector is obtained from the initial position and a plurality of velocity vectors of the target corresponding to the plurality of radar devices. In an embodiment, the resultant velocity vector is obtained by using equations (5) and (6), as described with reference to FIG. 3. Herein, the subsequent target position estimated in a mesh grid form.

At 506, the method 500 includes determining whether a number of outlier grid-points in the mesh grid is more than a threshold number of grid-points. If it is determined at 506, that the number of outlier grid-points in the mesh grid is less than or equal to the threshold number of grid-points, the method 500 includes replacing the outlier grid-points with interpolated grid-points obtained based on linear interpolation to obtain the subsequent position of the target in mesh grid form, at 508.

If however, the number of outlier grid-points in the mesh grid is determined to be more than the threshold number of grid-points at 506, the method 500 includes repairing the subsequent position of the target based on a determination of a probable position of the target obtained from at least one of a linear regression based analysis of prior positions of the target, a prior knowledge of the target velocity and sampling interval, and a trilateration based technique, at 512. A detailed flow-diagram for tracking of motion of target in the indoor environment is described further in detail with reference to FIGS. 6A-6B.

Figure 6A:
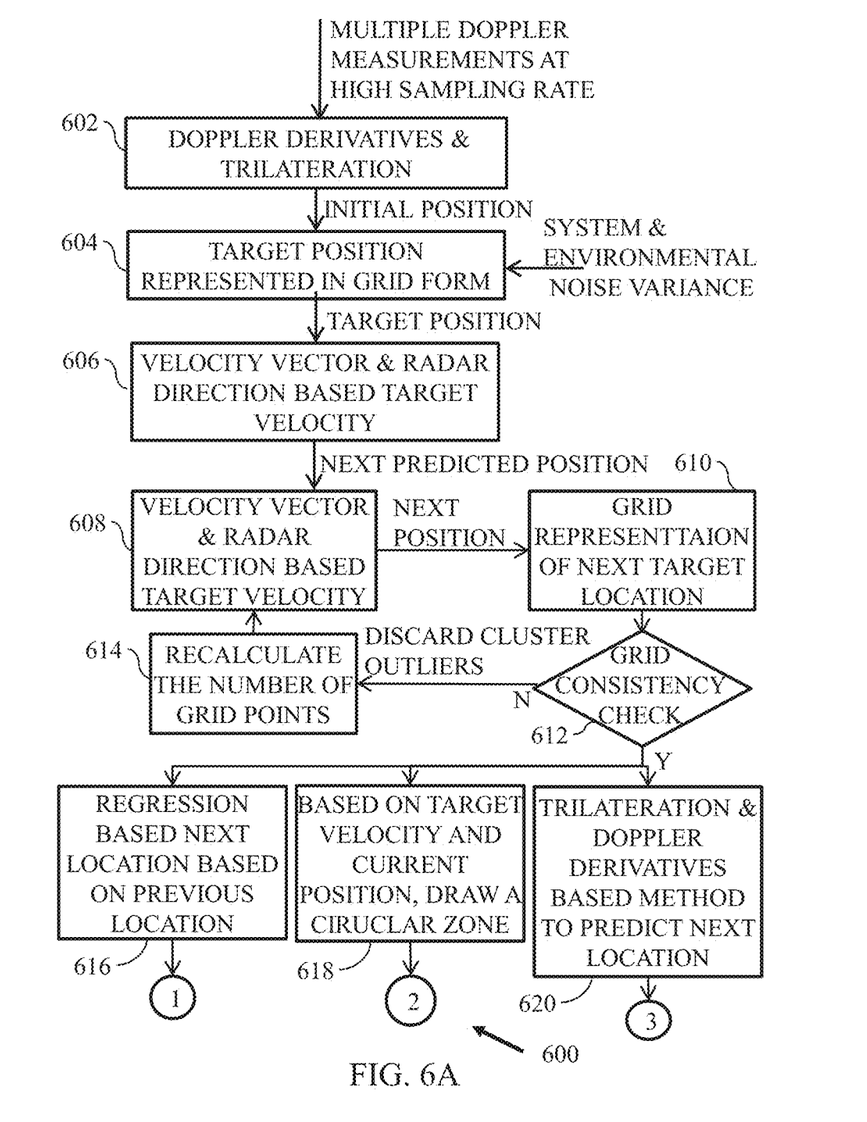
FIGS. 6A and 6B illustrate a flow diagram of a method for tracking motion of target in indoor environment, according to some embodiments of the present disclosure.
Figure 6B:
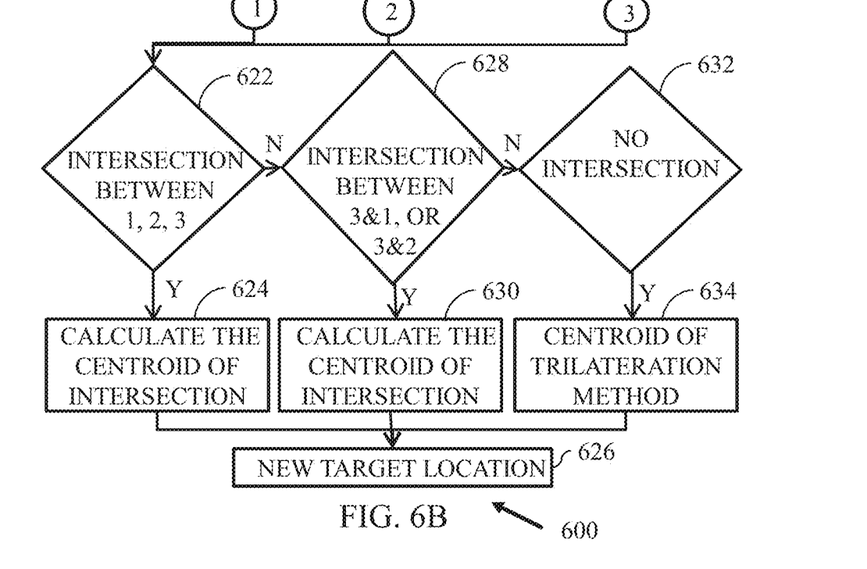

FIGS. 6A and 6B illustrate a flow diagram of a method 600 for tracking motion of target in indoor environment, in accordance with an example embodiment. Herein, for the description of the method references will be made to FIGS. 1-5.

In the beginning first the initial position of the target needs to be estimated. The radar devices collects data at a high sampling rate (compare to the object speed) to get three successive Doppler frequency values f(0), f(τ), f(2τ) at 602, where τ is the time interval between Doppler samples as shown in equation 1. Using said Doppler values, Doppler derivatives (f,ḟ,f̈) are calculated as shown equation (1). Subsequently these Doppler derivatives are used to calculate the target range with respect to each radar device, as shown in equation (2).

$$\begin{bmatrix} f \\ \dot{f}\tau \\ \ddot{f}\tau^2/2 \end{bmatrix} = \begin{bmatrix} 1 & 0 & 0 \\ -3/2 & 2 & -1/2 \\ 1/2 & -1 & 1/2 \end{bmatrix} \begin{bmatrix} f(0) \\ f(\tau) \\ f(2\tau) \end{bmatrix} \quad (1)$$

$$R_0 \cong (3/2)\lambda(\dot{f}f/\ddot{f}) \quad (2)$$

Then using target range as input to the trilateration method, the position of the target is calculated, at 604. It may be assumed that the target is a human being roaming in an indoor environment. Depending upon the experimental scenario heuristic constraint are applied to check the calculated target position. Here in this particular case the z coordinate may lie within 0<z<1.8 meter based on the human height into consideration. If the calculated xyz position don't lies in the predefined z region, subsequent three Doppler values are taken into consideration do find out the initial target coordinates.

In order to model the system and environmental noise, the initial xyz target position is represented into a mesh grid form, for example of 20 points at 604. The centre of the mesh grid is the calculated position and the mesh area depends on the target speed and noise variance. Here, every grid may be a possible position of the target.

Thereafter, for next target movement every radar device may get a speed (i.e. velocity) in its line of sight $V_{r_i}$ at 608, as shown in equation (3), where $R_i$ is the $i^{th}$ radar position, xyz is the present target position and $\bar{V}$ is the target velocity vector. Doppler is calculated from the radar detected velocity as shown in equation (4).

$$V_{r_i} = dot(R_i - xyz, \bar{V})/norm(R_i - xyz) \quad (3)$$

$$f_{d_i} = \frac{2V_{r_i}}{\lambda} \quad (4)$$

Where, λ is the wavelength of the radar transmitted frequency. By combining readings from multiple radar devices, the velocity vector $\bar{V}_{Est}$ is recreated, at 610.

Herein, the velocity vector $\bar{V}_{Est}$ is calculated by solving an equation based on the radar direction vector ($D_i$) and the received velocity ($V_{r_i}$) by each radar device, as shown in equation (5) and (6).

a. Steps $$D_i = (xyz_p - R_i) \quad (5)$$

$$\overline{V}_{Est} \Leftarrow g(V_{r_1}, V_{r_2}, \ldots, V_{r_N}, D_1, D_2 \ldots D_i) \text{ where, } i \geq 3, \quad (6)$$

b. At 610, the next position of an target is projected by using the below equation 7, where dt is the sampling interval $$xyz_p \Leftarrow xyz_p + \overline{V}_{Est} \cdot dt \quad (7)$$

As mentioned previously, instead of a single point (xyz) the target position is represented as grid mesh $xyz_{p_1}$, $xyz_{p_2}, \ldots xyz_{p_n}$ so the subsequent target position may also be in the form of a grid mesh as shown in FIG. 4.

Using grid consistency logic at 612, if it is determined that all the position points does not fall inside the mesh grid or in a Euclidean distance based single cluster, then those grid-points are discarded/ignored from the remaining calculation. Ignored grid-points are replaced based on linear interpolation to make the identical grid length at 614. However if more than 20% of the grid points lies outside the cluster will update or repair the correct position based on trilateration method.

As mentioned earlier, when more than 20% grid points lies outside a cluster, trilateration based method is called to correct the current target position. To update the current position the intersection of three approaches is used. First a linear regression based analysis is run on the prior positions to get a hypothesis of the next target position, at 616. Another approach is based on the prior knowledge of the target velocity and sampling interval a sphere of specific radius around the present target position is drawn at 618, which is possibly the target next position. The trilateration based approach is used to get the current target position, at 620. Due to noise in trilateration instead of a circle, a donut circle like structure is obtained, and depending on the number of the radar devices, a number of donut circle like structure are drawn, as shown in FIG. 4B.

If it is determined at 622 that all the three methods have an intersection area, the centroid of the area is computed at 624, and said centroid is taken as next target position at 626. However, if it is determined that any two methods are intersecting at 628, then centroid of that common area is calculated at 630, and said centroid is taken as the next position of the target at 626. If it is determined at 632 that there is no intersection between aforementioned three methods, then at 634 centroid of the trilateration method is computed and at 626, the trilateration based centroid position is taken as the subsequent target position. After the current position of the target is updated, the target localization is performed as explained previously using equations (3)-(7). An example of tracking of motion of a target in an indoor environment is described further with reference to FIGS. 7A-7B.

Figure 7A:
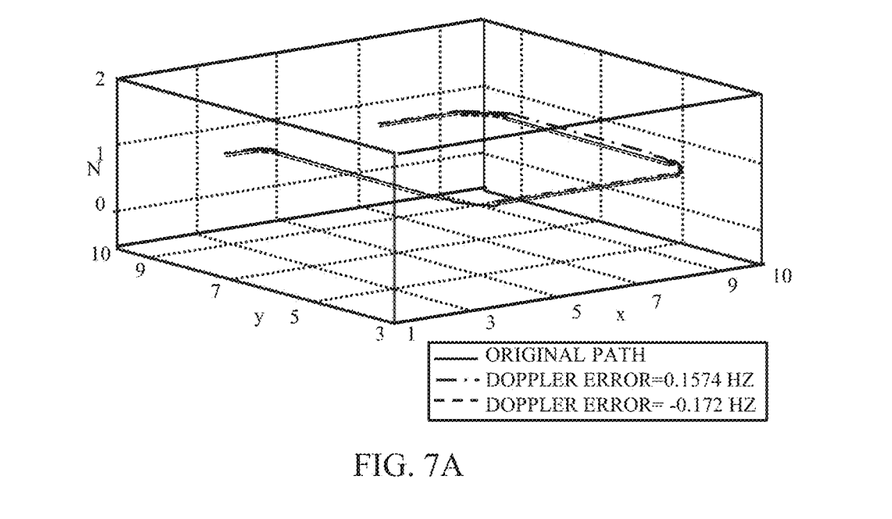
FIGS. 7A-7B illustrates an example of tracking of motion of a target in an indoor environment, according to some embodiments of the present disclosure.
Figure 7B:
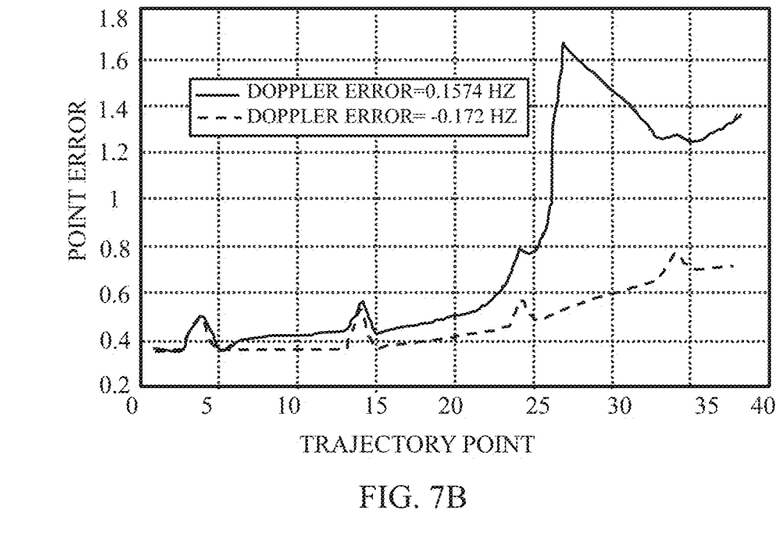

Example Scenario:

Referring now to FIGS. 7A-7B, in the present example scenario, three radar devices are directed towards the centre of the indoor environment, for example, a room. The target is moving in the xy plane. Initial position of the target is known by Levanon method. Next, target trajectory is defined and the velocity is estimated to be between 0 meter/sec to 0.5 meter/sec. Here radar azimuth angle is ±60° (6 dB beam width), elevation angle±25° (6 dB beam width).

From each movement (i.e. velocity), every radar device gets a speed in its line of sight (LOS). Doppler measurement error is introduced in the velocity measurement. So, if readings from multiple radar devices are combined, the resultant velocity vector is obtained. From the resultant velocity vector and the present position, the next position of the target is calculated.

In the present example scenario, up to ±0.01 Hz of Doppler measurement error is introduced during initial position estimation. Then, the target trajectory is simulated based on previous geometric based method. In this case, the total mean square error is determined to be <0.5 meter.

In this method, the error is getting accumulated. Therefore, to avoid accumulation of error, the target position is calibrated in a certain interval of time. Said calibration may be done by selecting the centroid of the intersection area of different methods, as previously discussed. These methods include regression based next position prediction, circular zone based on target velocity and current position, trilateration and Doppler derivatives prediction.

Various embodiments disclosed herein presents method and system for tracking motion of target in an indoor environment. An important contribution of the disclosed embodiments is that said method and system enables tracking in indoor environments with great accuracy, up to the level of meter.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for tracking motion of a target in indoor environment, the method comprising:
    estimating, via one or more hardware processors, an initial position of the target based at least on radar data captured from a plurality of radar devices installed in the indoor environment, wherein the initial position of the target estimated is in form of a mesh grid having a plurality of grid-points;
    estimating, for a subsequent target movement, a subsequent position of the target based on the initial position of the target and a resultant velocity vector of the target, via the one or more hardware processors, the resultant velocity vector obtained from the initial position and a plurality of velocity vectors of the target corresponding to the plurality of radar devices, the subsequent target position estimated in form of a mesh grid;
    determining, via the one or more hardware processors, whether a number of outlier grid-points in the mesh grid associated with the subsequent position of the target is more than a threshold number of grid-points; and
    performing, via one or more hardware processors, based on the determination of the number of outlier grid-points, to obtain the subsequent position of the target:
        replacing the outlier grid-points with interpolated grid-points obtained based on a linear interpolation to obtain the subsequent position of the target in the form of the mesh grid, if the number of outlier grid-points in the mesh grid is less than or equal to the threshold number of grid-points, and
        repairing the subsequent position of the target based on a determination of a probable position of the target obtained from at least one of a linear regression based analysis of prior positions of the target, a prior knowledge of the target velocity and sampling interval, and a trilateration based technique, if the number of outlier grid-points in the mesh grid is more than the threshold number of grid-points.

2. The processor implemented method of claim 1, wherein estimating the initial position of the target comprises:
    collecting the radar data, by each of the plurality of radar devices, at a sampling rate comparable to speed of the target to obtain a plurality of successive Doppler frequency;
    calculating Doppler derivatives $(f,\dot{f},\ddot{f})$ using the Doppler values;
    calculating a target range with respect to each radar device using the Doppler derivatives;
    calculating the initial position of the target using the target range as an input to the trilateration; and
    applying one or more heuristic constraints to validate the calculated initial position of the target.

3. The processor implemented method of claim 1, wherein estimating the subsequent position of the target comprises:
    obtaining velocity of the target in line of sight $V_{r_i}$ of each of the plurality of radar device using equations;

$$V_{ri} = \text{dot}(R_i - xyz, \overline{V})/\text{norm}(R_i - xyz)$$

$$f_{di} = 2V_{ri}/\lambda$$

where,
$\lambda$ is the wavelength of frequency transmitted by each of the plurality of radar devices,
$R_i$ is the position of $i^{th}$ radar device of the plurality of radar devices,
xyz is the initial target position, and
$\overline{V}$ is the velocity vector of the target;
combining velocity of target obtained from each of the plurality of radars to obtain the velocity vector $\overline{V}_{Est}$ using equations:

$$D_i = (xyz_p - R_i)$$

$$\overline{V}_{Est} \Leftarrow g(V_{r1}, V_{r2}, \ldots, V_{rN}, D_1, D_2, \ldots D_i) \text{ where, } i \geq 3$$

where,
    $(D_i)$ is the radar direction vector for ith radar device of the plurality of radar devices,
    $(V_{r_i})$ is the received velocity by each of the plurality of radar devices, projecting the subsequent position of the target by using the equation, $$xyz_p \Leftarrow xyz_p + \overline{V}_{Est} \cdot dt$$

where, dt is the sampling interval.

4. The processor implemented method of claim 1, wherein the threshold number of grid-points in the mesh-grid associated with the subsequent position of the target is determined based on at least one of a radius of said mesh grid and Euclidean distance based cluster of the grid-points.

5. The processor implemented method of claim 1, wherein repairing the subsequent position of the target comprises:
    drawing a circular zone based on a current position of the target and the estimated velocity of the target to obtain a first area;

17 predicting the current position based on regression of previous positions of the target and representing the current position by a second area;
performing trilateration based on radar data and using Levanon technique to obtain a third area; and
obtaining intersection between the first area, the second area and the third area, wherein a centroid of the first area, the second area and the third area is taken as the subsequent position of the target.

6. A system (300), comprising:
a memory (302) storing instructions;
one or more communication interfaces (306); and
one or more hardware processors (304) coupled to the memory (302) via the one or more communication interfaces (306), wherein the one or more hardware processors (304) are configured by the instructions to:
estimate an initial position of the target based at least on radar data captured from a plurality of radar devices installed in the indoor environment, the initial position of the target estimated in form of a mesh grid having a plurality of grid-points;
estimate, for a subsequent target movement, a subsequent position of the target based on the initial position of the target and a resultant velocity vector of the target, the resultant velocity vector obtained from the initial position and a plurality of velocity vectors of the target corresponding to the plurality of radar devices, the subsequent target position estimated in form of a mesh grid;
determine whether a number of outlier grid-points in the mesh grid associated with the subsequent position of the target is more than a threshold number of grid-points; and
perform, based on the determination of the number of outlier grid-points, to obtain the subsequent position of the target:
replace the outlier grid-points with interpolated grid-points obtained based on linear interpolation to obtain the subsequent position of the target in the form of mesh grid, if the number of outlier grid-points in the mesh grid is less than or equal to the threshold number of grid-points, and
repair the subsequent position of the target based on a determination of a probable position of the target obtained from at least one of a linear regression based analysis of prior positions of the target, a prior knowledge of the target velocity and sampling interval, and a trilateration based technique, if the number of outlier grid-points in the mesh grid is more than the threshold number of grid-points.

7. The system of claim 6, wherein to estimate the initial position of the target, the one or more hardware processors are configured by the instructions to:
collect the radar data, by each of the plurality of radar devices, at a sampling rate comparable to speed of the target to obtain a plurality of successive Doppler frequency;
calculate Doppler derivatives (f,ḟ,f̈) using the Doppler values;
calculate a target range with respect to each radar device using the Doppler derivatives;
calculate the initial position of the target using the target range as an input to the trilateration; and
apply one or more heuristic constraints to validate the calculated initial position of the target.

18

8. The system of claim 6, wherein to estimate the subsequent position of the target, the one or more hardware processors are configured by the instructions to:
obtain velocity of the target in line of sight $V_{r_i}$ of each of the plurality of radar device using equations;

$$V_{r_i} = \text{dot}(R_i - xyz, \overline{V})/\text{norm}(R_i - xyz)$$

$$f_{d_i} = 2V_{r_i}/\lambda$$

where,
$\lambda$ is the wavelength of frequency transmitted by each of the plurality of radar devices,
$R_i$ is the position of $i^{th}$ radar device of the plurality of radar devices,
xyz is the initial target position, and
$\overline{V}$ is the velocity vector of the target;
combining velocity of target obtained from each of the plurality of radars to obtain the velocity vector $\overline{V}_{Est}$ using equations:

$$D_i = (xyz_p - R_i)$$

$$\overline{V}_{Est} \Leftarrow g(V_{r_1}, V_{r_2}, \ldots V_{r_N}, D_1, D_2, \ldots D_i) \text{ where, } i \geq 3$$

where,
$(D_i)$ is the radar direction vector for ith radar device of the plurality of radar devices,
$(V_{r_i})$ is the received velocity by each of the plurality of radar devices,
projecting the subsequent position of the target by using the equation, $$xyz_p \Leftarrow xyz_p + \overline{V}_{Est} \cdot dt$$

where dt is the sampling interval.

9. The system of claim 6, wherein the one or more hardware processors are further configured by the instructions to determine threshold number of grid-points in the mesh-grid associated with the subsequent position of the target based on at least one of a radius of said mesh grid and Euclidean distance based cluster of the grid-points.

10. The system of claim 6, wherein to repair the subsequent position of the target, the one or more hardware processors are configured by the instructions to:
draw a circular zone based on a current position of the target and the estimated velocity of the target to obtain a first area;
predict the current position based on regression of previous positions of the target and representing the current position by a second area;
perform trilateration based on radar data and using Levanon technique to obtain a third area; and
obtain intersection between the first area, the second area and the third area, wherein
a centroid of the first area, the second area and the third area is taken as the subsequent position of the target.

11. One or ore non-transitory machine readable information storage mediums comprising one or more instructions which when executed by one or more hardware processors cause:
estimating, via one or more hardware processors, an initial position of the target based at least on radar data captured from a plurality of radar devices installed in the indoor environment, wherein the initial position of the target estimated is in form of a mesh grid having a plurality of grid-points;
estimating, for a subsequent target movement, a subsequent position of the target based on the initial position of the target and a resultant velocity vector of the target, via the one or more hardware processors, the resultant velocity vector obtained from the initial position and a plurality of velocity vectors of the target corresponding to the plurality of radar devices, the subsequent target position estimated in form of a mesh grid;

determining, via the one or more hardware processors, whether a number of outlier grid-points in the mesh grid associated with the subsequent position of the target is more than a threshold number of grid-points; and performing, via one or more hardware processors, based on the determination of the number of outlier grid-points, to obtain the subsequent position of the target:

replacing the outlier grid-points with interpolated grid-points obtained based on a linear interpolation to obtain the subsequent position of the target in the form of the mesh grid, if the number of outlier grid-points in the mesh grid is less than or equal to the threshold number of grid-points, and repairing the subsequent position of the target based on a determination of a probable position of the target obtained from at least one of a linear regression based analysis of prior positions of the target, a prior knowledge of the target velocity and sampling interval, and a trilateration based technique, if the number of outlier grid-points in the mesh grid is more than the threshold number of grid-points.

12. The one or more non-transitory machine readable information storage mediums of claim 11, wherein estimating the initial position of the target comprises:

collecting the radar data, by each of the plurality of radar devices, at a sampling rate comparable to speed of the target to obtain a plurality of successive Doppler frequency;

calculating Doppler derivatives $(f, \dot{f}, \ddot{f})$ using the Doppler values;

calculating a target range with respect to each radar device using the Doppler derivatives;

calculating the initial position of the target using the target range as an input to the trilateration; and applying one or more heuristic constraints to validate the calculated initial position of the target.

13. The one or more non-transitory machine readable information storage mediums of claim 11, wherein estimating the subsequent position of the target comprises:

obtaining velocity of the target in line of sight $V_{r_i}$ of each of the plurality of radar device using equations;

$$V_{ri} = \text{dot}(R_i - xyz, \overline{V})/\text{norm}(R_i - xyz)$$

$$f_{di} = 2V_{ri}/\lambda$$

where, $\lambda$ is the wavelength of frequency transmitted by each of the plurality of radar devices, $R_i$ is the position of $i^{th}$ radar device of the plurality of radar devices, xyz is the initial target position, and $\overline{V}$ is the velocity vector of the target;

combining velocity of target obtained from each of the plurality of radars to obtain the velocity vector $\overline{V}_{Est}$ using equations:

$$D_i = (xyz_p - R_i)$$

$$\overline{V}_{Est} \Leftarrow g(V_{r1}, V_{r2}, \ldots V_{rN}, D_1, D_2 \ldots D_i) \text{ where, } i \geq 3$$

where, $(D_i)$ is the radar direction vector for ith radar device of the plurality of radar devices, $(V_{r_i})$ is the received velocity by each of the plurality of radar devices, projecting the subsequent position of the target by using the equation, $$xyz_p \Leftarrow xyz_p + \overline{V}_{Est} \cdot dt$$

where, dt is the sampling interval.

14. The one or more non-transitory machine readable information storage mediums of claim 11, wherein the threshold number of grid-points in the mesh-grid associated with the subsequent position of the target is determined based on at least one of a radius of said mesh grid and Euclidean distance based cluster of the grid-points.

15. The one or more non-transitory machine readable information storage mediums of claim 11, wherein repairing the subsequent position of the target comprises:

drawing a circular zone based on a current position of the target and the estimated velocity of the target to obtain a first area;

predicting the current position based on regression of previous positions of the target and representing the current position by a second area;

performing trilateration based on radar data and using Levanon technique to obtain a third area; and obtaining intersection between the first area, the second area and the third area, wherein a centroid of the first area, the second area and the third area is taken as the subsequent position of the target.

* * * * *